United States Patent
Bhattacharya et al.

(10) Patent No.: US 6,842,555 B2
(45) Date of Patent: Jan. 11, 2005

(54) METHOD AND APPARATUS FOR OPTICAL SWITCHING WITH SAME SIDE INPUT AND OUTPUTS

(75) Inventors: Shanti Bhattacharya, Cambridge, MA (US); Jeffrey Swift, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 70 days.

(21) Appl. No.: 10/197,799

(22) Filed: Jul. 18, 2002

(65) Prior Publication Data

US 2004/0013349 A1 Jan. 22, 2004

(51) Int. Cl.[7] .......................... G02B 6/35; G02B 7/182
(52) U.S. Cl. ...................................... 385/18; 359/872
(58) Field of Search .................................. 385/16–18

(56) References Cited

U.S. PATENT DOCUMENTS

| | | | | |
|---|---|---|---|---|
| 6,222,954 B1 | | 4/2001 | Riza | 385/18 |
| 6,330,380 B1 | * | 12/2001 | Young et al. | 385/17 |
| 6,337,940 B1 | * | 1/2002 | Lefevre | 385/37 |
| 6,526,198 B1 | * | 2/2003 | Wu et al. | 385/18 |
| 6,542,657 B2 | * | 4/2003 | Anderson | 385/18 |
| 6,606,428 B2 | * | 8/2003 | Goldstein et al. | 385/18 |
| 6,636,654 B2 | * | 10/2003 | McGuire, Jr. | 385/17 |
| 2001/0006569 A1 | * | 7/2001 | Lin | 385/18 |
| 2002/0057864 A1 | * | 5/2002 | Mills et al. | 385/18 |
| 2003/0152314 A1 | * | 8/2003 | Aoki et al. | 385/16 |

FOREIGN PATENT DOCUMENTS

| | | | |
|---|---|---|---|
| EP | 1 102 104 | 5/2001 | G02B/26/02 |
| WO | WO 01/65300 | 9/2001 | G02B/26/00 |
| WO | WO 01/67159 | 9/2001 | G02B/26/00 |
| WO | WO 01/73935 | 10/2001 | H02N/1/00 |

* cited by examiner

*Primary Examiner*—John D. Lee
*Assistant Examiner*—Tina M Lin
(74) *Attorney, Agent, or Firm*—Bromberg & Sunstein LLP

(57) ABSTRACT

An optical switch (a/k/a "optical switching unit") includes at least two sides, an input, a plurality of outputs on the same side as the input. The optical switch further includes a plurality of mirrors to direct light beams between the input and at least one of the plurality of outputs. The plurality of mirrors illustratively are pop-up mirrors.

22 Claims, 4 Drawing Sheets

METHOD AND APPARATUS FOR OPTICAL SWITCHING WITH SAME SIDE INPUT AND OUTPUTS

FIELD OF THE INVENTION

The invention relates generally to optical devices and, more particularly, the invention relates to optical switches for directing a light beam between an input and an output.

BACKGROUND OF THE INVENTION

Optical networks are becoming the data transmission medium of choice in the networking field. Among other advantages, optical networks generally have a higher bandwidth and lower power/line loss. To these ends, optical fibers carrying data typically connect with an optical switching device that transmits incoming light signals to selected other connected optical fibers. An optical switching device ("switch") thus typically has at least one input and a plurality of outputs. Internal mirrors within the switch reflect encoded light beams from the input to a selected one of the outputs.

One common characteristic in many prior art mirrors is the relative locations of the inputs and outputs. Specifically, the inputs on many prior art switches often are on a different side of the switch than that of the outputs. Consequently, some such switches can be relatively intolerant to unintended switch movement relative to the fibers. For example, unintended movement may misalign various components, thus adversely affecting switch performance. In addition, such switches cannot use a single ribbon fiber to connect with all of the inputs and outputs.

SUMMARY OF THE INVENTION

In accordance with one aspect of the invention, an optical switch (a/k/a "optical switching unit") includes at least two sides, an input, and a plurality of outputs on the same side as the input. The optical switch further includes a plurality of mirrors to direct light beams between the input and at least one of the plurality of outputs. The plurality of mirrors illustratively are pop-up mirrors.

In some embodiments, the optical switch includes a package that has the at least two sides. Exemplary optical switches may include two inputs and two outputs. Embodiments of the invention are configured so that the input and outputs are parallel. A ribbon fiber may be coupled with the input and the plurality of outputs. All optical paths illustratively are equal within the optical switch.

Some embodiments permit no more than one side of the optical switch to have inputs or outputs. Other embodiments, however, permit the optical switch to have additional inputs and additional outputs on a different side than that of the originally noted input and plurality of outputs. In use, the optical switch illustratively is aligned with a fiber. For at least one pre-specified direction, alignment thus is maintained if at least a portion of the switch shifts in the at least one specified direction.

In accordance with other aspects of the invention, an optical switch with two sides may receive a light beam, and then emit the light beam from the optical switch via one of a plurality of locations. The plurality of locations may be on the same side that receives the light beam. The light beam is directed between the location where it was received and the location from which it is to be emitted from the switch.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, an optical switch is configured to have inputs and corresponding outputs on the same side of the switch. In other words, encoded beams of light received by the switch are transmitted, via optical switching processes, to output fibers that are substantially parallel to those coupled with the input(s). Consequently, the optical switch may be more tolerant to unintended movement. If such unintended movement occurs, such as during manufacture, component correction should be more efficient. Details of illustrative embodiments are discussed below.

Figure 1:
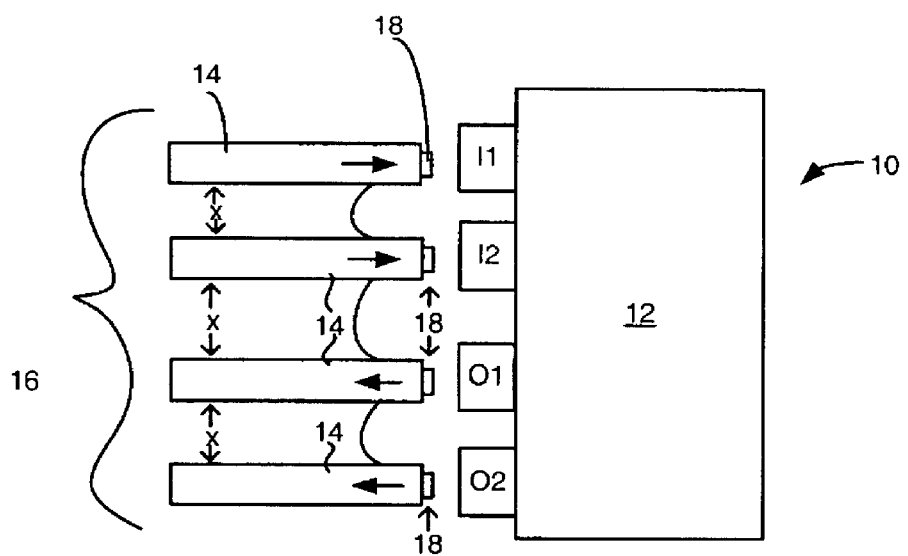
FIG. 1 schematically shows an optical switch implemented in accordance with illustrative embodiments of the invention.

FIG. 1 schematically shows an exemplary 2×2 optical switch 10 configured in accordance with illustrative embodiments of the invention. The optical switch 10 has two inputs (respectively identified as input I1 and input I2) and two outputs (respectively identified as output O1 and output O2). The two inputs I1 and I2 are on the same side of the switch 10 as the outputs O1 and O2. This configuration of inputs and outputs (i.e., ports) may be referred to herein as being a "parallel configuration."

As discussed in greater detail below with reference to FIGS. 2A and 2B, the optical switch 10 has internal components, contained within a package 12, for redirecting light beams. More specifically, these internal components cooperate to direct input light beams from each of the inputs I1 and I2 to either one of the outputs O1 and O2.

In addition to the optical switch 10, FIG. 1 also shows a plurality of parallel fiber optic cables 14 coupled with the inputs I1 and I2 and outputs O1 and O2. In illustrative embodiments, the fiber optic cables 14 form a composite device known as a ribbon cable 16. As known by those skilled in the art, ribbon cables 16 typically include two or more fiber optic cables 14 that are spaced a constant distance apart. For example, the ribbon cable 16 used with the optical switch 10 shown in FIG. 1 has four fiber optic cables 14. Each fiber optic cable 14 is spaced a distance "X" (see FIG. 1) from one or two of the other fiber optic cables 14 in the ribbon 16.

A lens 18 also illustratively is coupled between each fiber optic cable 14 and port. The optical switch 10 shown in FIG. 1 thus includes four lenses 18—one for each port. As known by those skilled in the art, the lens 18 may be used at the interface of a switch port and a fiber optic cable 14 to collimate an incoming or outgoing light beam. The lens 18 may be a part of the fiber optic cable 14, or a separate component added to the switch/fiber optic cable assembly during manufacture. In some embodiments, the lens 18 is coupled with the ports before the fiber optic cable 14 is connected. Embodiments of the invention are discussed, however, as if the fiber optic cable 14 and lens 18 were a single unit. Of course, it should be understood that various embodiments are not limited as such. In fact, some embodiments do not use a lens 18. Discussion of lenses 18 thus is illustrative and not intended to limit various embodiments of the invention.

It should be noted that various other embodiments are not limited to ribbon cables 16. Accordingly, discussion of ribbon cables 16 is not intended to limit all embodiments of the invention. In a similar manner, various embodiments are not limited to 2×2 optical switches. Other types of switches may be used, such as 1×2 and 2×N optical switches. In fact, many optical switches having M×N ports may be used, where M is greater than or equal to one, and N is greater than one. Accordingly, discussion of 2×2 switches is exemplary and not intended to limit all embodiments of the invention.

Figure 2:
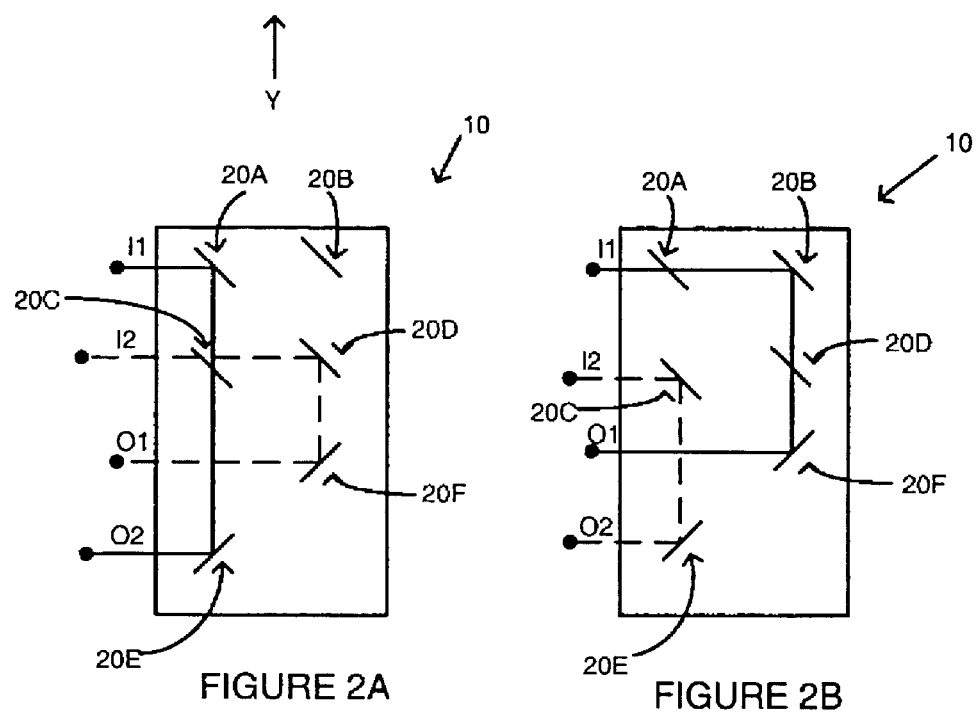
FIG. 2A schematically shows the interior mirrors of the optical switch shown in FIG. 1 when in a first state.
FIG. 2B schematically shows the interior mirrors of the optical switch shown in FIG. 1 when in a second state.

FIGS. 2A and 2B schematically show an internal mirror arrangement within the optical switch 10 of FIG. 1. As noted above, these mirrors (identified as mirrors 20A, 20B, 20C, 20D, 20E, and 20F) direct encoded light beams from each of the inputs to one of the two outputs. FIG. 2A shows the optical switch 10 in a first mode, in which a first light beam is directed from input I1 to output O2, and a second light beam is directed from input I2 to output O1. When in this state, a first set of mirrors is used to direct the light beams. Specifically, the first set of mirrors includes mirrors identified by reference numbers 20A, 20D, 20E, and 20F. The first beam is reflected by mirrors 20A and 20E, while the second light beam is reflected by mirrors 20D and 20F. Mirrors 20B and 20C are not used in this (first) mode.

FIG. 2B shows the same optical switch 10 in a second mode, in which the first light beam is directed from input I1 to output O1, and the second light beam is directed from input I2 to output O2. When in this state, a second set of mirrors is used to direct the light beams. Specifically, the second set of mirrors includes mirrors identified by reference numbers 20B, 20C, 20E, and 20F. The first beam is reflected by mirrors 20B and 20F, while the second light beam is reflected by mirrors 20C and 20E. Mirrors 20A and 20D are not used in this (second) mode.

In both the first and second modes, the light beams illustratively travel along optical paths (formed by the mirrors and ports) having substantially identical optical path lengths. For example, the optical path length in the first mode between input I1 and output O2 is substantially equal to the optical path length in the first mode between input I2 and output O1. In a similar manner, the optical path length in the second mode between input I1 and O1 is substantially equal to the optical path length between input I2 and output O2. In fact, all such noted path lengths illustratively are substantially equal in all modes.

The fiber optic cables 14 coupled with the inputs I1 and I2, and outputs O1 and O2, illustratively are staggered (with respect to their connection to their respective ports) to ensure substantially equal optical path lengths. Specifically, as known by those skilled in the art, the optical path length of a light beam is the product of the medium index of refraction and the distance traveled. Accordingly, this staggering may be a logical staggering (i.e., modify the index of refraction) or a physical staggering (i.e., modify the distance between the fiber optic cable 14 and the port). In some instances, the cables 14 may be both logically and physically staggered.

To these ends, an additional material, such as glass, may be physically positioned between the fiber optic cable 14/lens 18 and the respective port to logically stagger the optical path length. Alternatively, the fiber optic cable 14/lens 18 may be moved a predetermined distance from the respective port to physically stagger the optical path length. Of course, as noted above, both processes can be performed to stagger the fiber optic cable(s) 14.

Redundant mirrors may be used to compensate for malfunctioning mirrors. Accordingly, if one of the mirrors in a given optical path malfunctions, the light beams may be re-routed to other mirrors, including redundant mirrors. If no mirrors malfunction, the redundant mirrors are not used. In a manner similar to the original optical paths, the optical paths used as a result of the re-routing illustratively have substantially equal optical path lengths to the other optical paths used by the optical switch 10. In some embodiments, however, the optical paths used as a result of the re-routing illustratively do not have substantially equal optical path lengths to the other optical paths used by the optical switch 10.

Malfunctioning mirrors may be detected and corrected at various times, such as during manufacture and actual use. For example, during manufacture, the mirrors in the optical switch 10 may be tested to determine if they will function for their intended purpose. Conventional software applications may be used to test and re-route optical paths with redundant mirrors. Alternatively or in addition to during manufacture, software and hardware may be used for the same purposes during operation of the switch 10.

In illustrative embodiments, the mirrors 20A–20F are commonly known "pop-up" mirrors. More specifically, the mirrors are the type that are either fully up (i.e., substantially perpendicular to the substrate of the switch 10), or fully down (i.e., substantially parallel to the substrate of the switch 10). As known by those skilled in the art, pop-up mirrors within a switch are capable of controllably reflecting a light beam when fully up, but not capable of such function when fully down. The mirrors nevertheless are angled with respect to other planes to direct the beams of light to their predetermined output. For example, a given mirror may be angled 45 degrees from the Y-axis shown in FIGS. 2A and 2B.

Any known type of actuation may be used to control the state of the mirrors (i.e., pivot the mirrors between "off" and "on" states). For example, comb drives that electrostatically control the mirrors may be used. Alternatively, a mechanical spring or some other similar device may be used to control the mirrors. In yet other embodiments, magnetic devices may be used. Each mirror may have a physical mirror stop to ensure that the mirrors do not extend beyond their substantially perpendicular configuration (with respect to the switch substrate).

Illustrative embodiments provide a number of advantages. Among others, optical switches configured in this manner may use a single ribbon cable 16 to connect to inputs and outputs. This simplifies fiber connection processes; namely, only one ribbon is connected instead of two or more as required by optical switches having ports on different sides. Consequently, assembly processes are simplified, thus saving costs. In addition, unintended switch movement may have less of an impact on performance than on some prior art optical switches. If such movement does occur and cable adjustment is necessary, then only one ribbon cable 16 is adjusted rather than two or more ribbons 16/cables 14. Moreover, using pop-up mirrors simplifies the overall switch 10 by not requiring extra circuitry to re-adjust mirror angles.

Illustrative embodiments also provide other advantages, such as permitting a larger array of 2×2 switches to be used on a single, undiced silicon wafer. Specifically, because all ports are parallel and on one side of the switch, more switches can be placed in an array without causing their connected fibers to interfere with each other. In addition, if the switch 10 shifts toward or away from their fibers (within anticipated tolerances), then alignment should not be affected.

Figure 3:
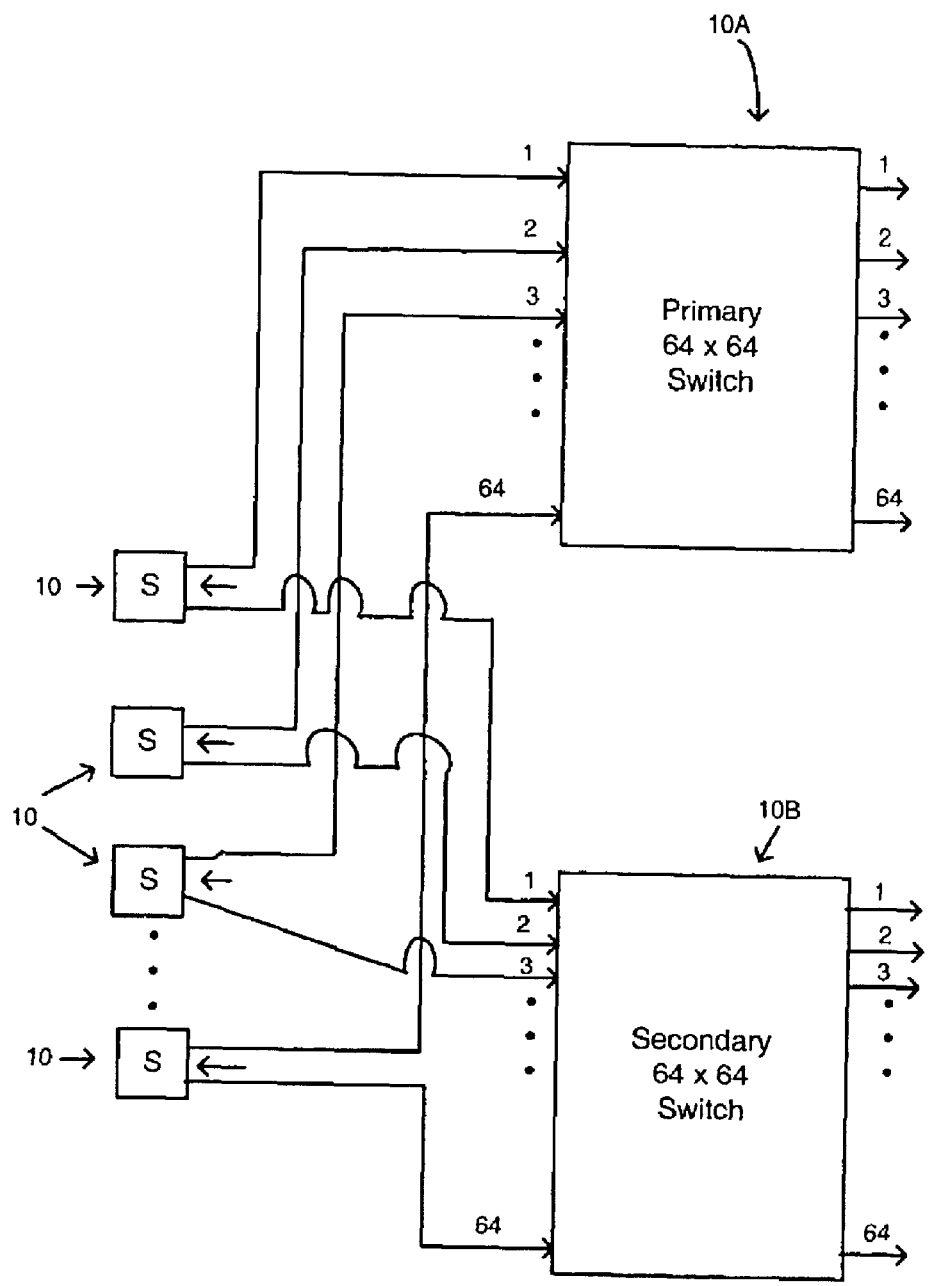
FIG. 3 schematically shows an array of optical switches used in an exemplary protection switching arrangement.

FIG. 3 schematically shows an exemplary use of an array of 2×2 optical switches 10. In this case, a 1×64 array of 2×2 optical switches 10 is used to provide switching protection for a 64×64 switch 10A. To that end, one output of each 2×2 optical switch 10 is connected to a primary 64×64 switch 10A, and the other output of each 2×2 switch 10 is connected to a secondary 64×64 switch 10B. This redundant arrangement ensures that if an input to the primary 64×64 switch 10A malfunctions, then the desired input signal is re-routed to the secondary 64×64 switch 10B. In other embodiments, to provide further switching protection, a second 1×64 array of 2×2 optical switches 10 (not shown) is coupled to the outputs of the switches 10A and 10B.

Figure 4:
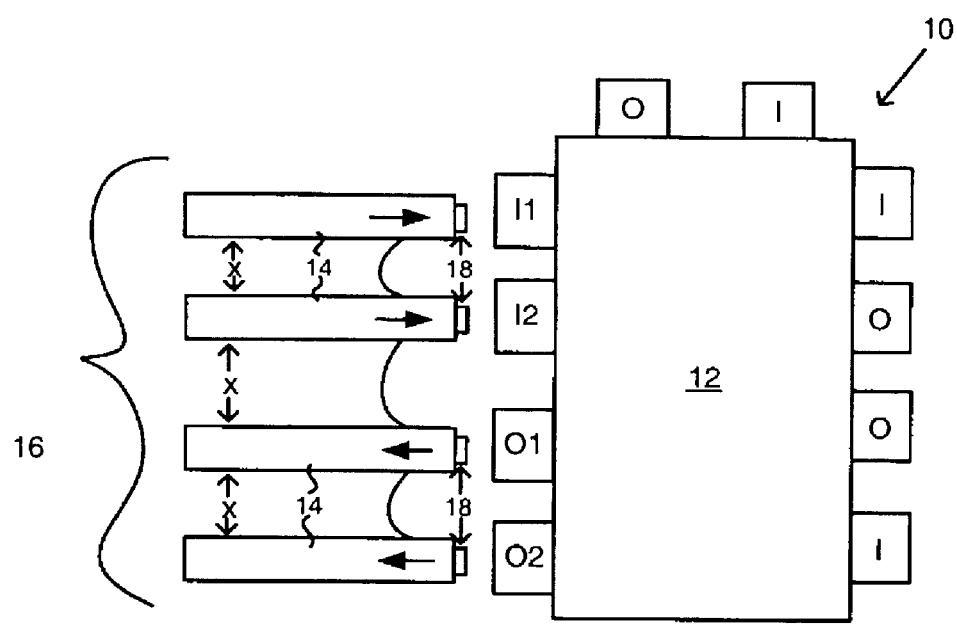
FIG. 4 schematically shows an alternative embodiment of the invention, in which additional ports are on other sides of the optical switch.

FIG. 4 schematically shows an alternative embodiment of the invention, in which additional ports are on other sides of the optical switch 10. Such ports may be inputs or outputs and thus, are respectively and generally identified by the letters "I" or "O." Of course, at least one set of ports on one of the sides of the optical switch 10 has both an input and an output for a single optical path. More specifically, one side of the optical switch 10 has at least one input and at least two outputs that are in the same optical path.

Principles of illustrative embodiments may be equally applied to a method of optical switching. In particular, a data encoded light beam received through an input in an optical switching unit may use pop-up mirrors to direct the light beam to a parallel output (i.e., an output on the same side as the input). Such a method should accomplish the same goals as the optical switch 10 described herein.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. An optical switch comprising:
   a plurality of inputs;
   a plurality of outputs;
   at least two sides;
   a plurality of mirrors to direct light beams between the plurality of inputs and the plurality of outputs, the plurality of mirrors being non-rotatable pop-up mirrors,
   the plurality of mirrors being arranged to be capable of simultaneously directing two light beams from the plurality of inputs to the plurality of outputs,
   the plurality of inputs being on the same side as the plurality of outputs.

2. The optical switch as defined by claim 1 further comprising a package, the package including the at least two sides.

3. The optical switch as defined by claim 1 wherein the plurality of inputs includes a first input and a second input, the plurality of outputs including a first output and a second output, the plurality of mirrors being arranged to be capable of directing a first light beam from the first input to the first output, the plurality of mirrors also being arranged to be capable of directing a second light beam from the second input to the second output.

4. The optical switch as defined by claim 1 wherein the plurality of inputs and plurality of outputs are parallel.

5. The optical switch as defined by claim 1 wherein no more than one side has inputs or outputs.

6. The optical switch as defined by claim 1 further comprising:
   additional inputs and additional outputs, the additional inputs and additional outputs being on a different side than that of the plurality of inputs and the plurality of outputs.

7. The optical switch as defined by claim 1 further comprising:
   a ribbon fiber coupled with the plurality of inputs and the plurality of outputs.

8. The optical switch as defined by claim 1 wherein the switch is aligned with a fiber, further wherein for at least one pre-specified direction, alignment is maintained if at least a portion of the switch shifts in the at least one specified direction.

9. An optical switch comprising:
   plural means for receiving a plurality of light beams;
   plural means for emitting the light beams from the optical switch;
   at least two sides;
   means for simultaneously directing the plurality of light beams between the plural receiving means and the plural emitting means, the directing means being non-rotatable pop-up mirrors,
   the receiving means being on the same side as the emitting means.

10. The optical switch as defined by claim 9 wherein the plural receiving means includes a plurality of inputs, and the plural emitting means includes a plurality of outputs.

11. The optical switch as defined by claim 9 further comprising a package including the two sides.

12. The optical switch as defined by claim 9 wherein the plural receiving means includes two inputs and the plural emitting means includes two outputs.

13. The optical switch as defined by claim 9 wherein the plural receiving means and the plural emitting means are parallel.

14. The optical switch as defined by claim 9 wherein no more than one side includes receiving means or emitting means.

15. The optical switch as defined by claim 9 further comprising:
   additional receiving means and additional plural emitting means, the additional receiving means and additional plural emitting means being on a different side than that of the plural receiving means and the plural emitting means.

16. The optical switch as defined by claim 9 wherein the switch is aligned with a fiber, further wherein for at least one pre-specified direction, alignment is maintained if at least a portion of the switch shifts in the at least one specified direction.

17. A method of optical switching comprising:
   receiving a plurality of data encoded light beams through a plurality of inputs of an optical switching unit, the optical switching unit having a first side, a second side, and a plurality of outputs, the plurality of inputs being on the first side of the switching unit;
   using non-rotatable pop-up mirrors within the optical switching unit to simultaneously direct the plurality of light beams from the plurality of inputs to of the plurality of outputs; and
   emitting the plurality of light beams from the optical switch,
   the plurality of light beams being emitted from the first side of the switch.

18. The method as defined by claim 17 wherein the optical switching unit includes a package.

19. The method as defined by claim 17 wherein the optical switching unit includes two inputs and two outputs.

20. The method as defined by claim 17 wherein the plurality of inputs is parallel to the plurality of outputs.

21. The method as defined by claim 17 wherein no more than one side of the optical switching unit includes any one of means for receiving a light beam and means for emitting a light beam.

22. The method as defined by claim 17 wherein all optical paths are equal within the optical switching unit.

* * * * *

UNITED STATES PATENT AND TRADEMARK OFFICE
CERTIFICATE OF CORRECTION

PATENT NO. : 6,842,555 B2
DATED : January 11, 2005
INVENTOR(S) : Shanti Bhattacharya et al.

It is certified that error appears in the above-identified patent and that said Letters Patent is hereby corrected as shown below:

<u>Column 6,</u>
Line 49, delete "of" after "to"

Signed and Sealed this

Tenth Day of May, 2005

JON W. DUDAS
*Director of the United States Patent and Trademark Office*